United States Patent
Liu et al.

(10) Patent No.: US 12,283,236 B2
(45) Date of Patent: Apr. 22, 2025

(54) PROCESSOR FOR COMPENSATE IMAGE AND OPERATION METHOD THEREOF

(71) Applicant: NOVATEK Microelectronics Corp., Hsinchu (TW)

(72) Inventors: Ching-Hua Liu, Hsinchu (TW); Yen-Tao Liao, Hsinchu (TW)

(73) Assignee: NOVATEK Microelectronics Corp., Hsinchu (TW)

(*) Notice: Subject to any disclaimer, the term of this patent is extended or adjusted under 35 U.S.C. 154(b) by 209 days.

(21) Appl. No.: 18/311,902

(22) Filed: May 4, 2023

(65) Prior Publication Data
US 2024/0371317 A1    Nov. 7, 2024

(51) Int. Cl.
G09G 3/3208 (2016.01)
G06F 3/14 (2006.01)
G06T 5/70 (2024.01)

(52) U.S. Cl.
CPC ............ *G09G 3/3208* (2013.01); *G06F 3/14* (2013.01); *G06T 5/70* (2024.01); *G09G 2320/0209* (2013.01)

(58) Field of Classification Search
CPC ......... G06G 3/3208; G06F 3/14; G06T 5/002; G06T 5/70; G09G 2320/0209
USPC .................................................. 345/76
See application file for complete search history.

(56) References Cited

U.S. PATENT DOCUMENTS

2015/0009188 A1*  1/2015  Choi ............... G09G 3/20
                                                       345/204

* cited by examiner

*Primary Examiner* — Mark Edwards
(74) *Attorney, Agent, or Firm* — CKC & Partners Co., LLC

(57) ABSTRACT

A processor is disposed in a display device and is configured to perform following operations: calculating a total coupling coefficient for a (N−1)th frame according to input data, in which N is a positive integer greater than 1; calculating a coupling coefficient difference value of two adjacent lines for a Nth frame according to the input data; generating a first compensation value for a target sub-pixel according to the coupling coefficient difference value and target input data of the target sub-pixel; generating a second compensation value for the target sub-pixel according to the first compensation value and the total coupling coefficient; generating an output data for the target sub-pixel according to the target input data and the second compensation value; and controlling a display panel in the display device to display a final image according to the output data.

20 Claims, 8 Drawing Sheets

| CC | R(Max.) | G(Max.) | B(Max.) |
|---|---|---|---|
|  | 322 | 262 | 438 |

FIG. 3

PROCESSOR FOR COMPENSATE IMAGE AND OPERATION METHOD THEREOF

BACKGROUND

Technical Field

The present disclosure relates to image processing technology. More particularly, the present disclosure relates to a processor for compensating image and an operation method thereof.

Description of Related Art

With developments of technology, display devices are applied to various electronic devices. In practical applications, there is line crosstalk problem in some display devices due to manufacturing process or types of the display devices. The problem is more serious in specific background (e.g., a white background or a black background). In some related approaches, a compensate capacitor is added or a compensation of a supply power (e.g., ELVDD power) to solve this problem, but the effect is not good.

SUMMARY

Some aspects of the present disclosure are to provide a processor. The processor is disposed in a display device and is configured to perform following operations: calculating a total coupling coefficient for a (N−1)th frame according to input data, in which N is a positive integer greater than 1; calculating a coupling coefficient difference value of two adjacent lines for a Nth frame according to the input data; generating a first compensation value for a target sub-pixel according to the coupling coefficient difference value and target input data of the target sub-pixel; generating a second compensation value for the target sub-pixel according to the first compensation value and the total coupling coefficient; generating an output data for the target sub-pixel according to the target input data and the second compensation value; and controlling a display panel in the display device to display a final image according to the output data.

Some aspects of the present disclosure are to provide an operation method of a processor in a display device. The operation method includes following operations: calculating, by the processor, a total coupling coefficient for a (N−1)th frame according to input data, in which N is a positive integer greater than 1; calculating, by the processor, a coupling coefficient difference value of two adjacent lines for a Nth frame according to the input data; generating, by the processor, a first compensation value for a target sub-pixel according to the coupling coefficient difference value and target input data of the target sub-pixel; generating, by the processor, a second compensation value for the target sub-pixel according to the first compensation value and the total coupling coefficient; generating, by the processor, an output data for the target sub-pixel according to the target input data and the second compensation value; and controlling, by the processor, a display panel in the display device to display a final image according to the output data.

BRIEF DESCRIPTION OF THE DRAWINGS

The disclosure can be more fully understood by reading the following detailed description of the embodiment, with reference made to the accompanying drawings as follows:

FIG. 3 is a schematic diagram illustrating coupling coefficients according to some embodiments of the present disclosure.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
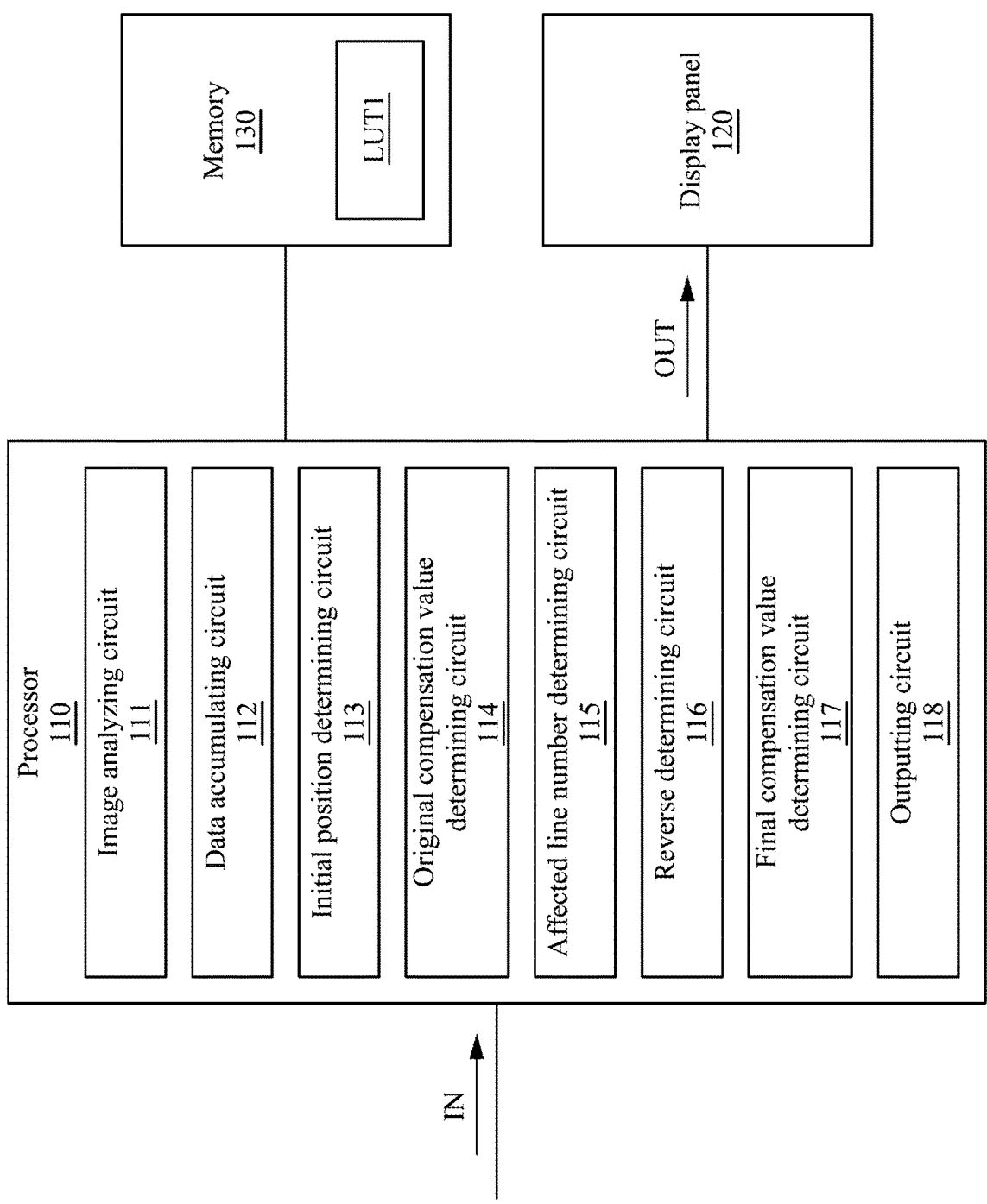
FIG. 1 is a schematic diagram illustrating a display device according to some embodiments of the present disclosure.

Reference is made to FIG. 1. FIG. 1 is a schematic diagram illustrating a display device 100 according to some embodiments of the present disclosure.

As illustrated in FIG. 1, the display device 100 includes a processor 110, a display panel 120, and a memory 130. The processor 110 is coupled to the display panel 120 and the memory 130.

The processor 110 is configured to receive input data IN of an image (e.g., a dynamic image) and process the input data IN to generate an output data OUT. In some embodiments, the processor 110 is implemented by hardware (e.g., circuits). As illustrated in FIG. 1, the processor 110 includes an image analyzing circuit 111, a data accumulating circuit 112, an initial position determining circuit 113, an original compensation value determining circuit 114, an affected line number determining circuit 115, a reverse determining circuit 116, a final compensation value determining circuit 117, and an outputting circuit 118.

The display panel 120 is configured to display a final image according to the output data OUT. In some embodiments, the display panel 120 is implemented by an organic light-emitting diode (OLED) display panel, but the present disclosure is not limited thereto.

The memory 130 is configured to store various data or information (e.g., one or more look-up tables LUT1). In some embodiments, the memory 130 is implemented by a non-transitory computer readable storage medium or by a transitory computer readable storage medium.

Figure 2:
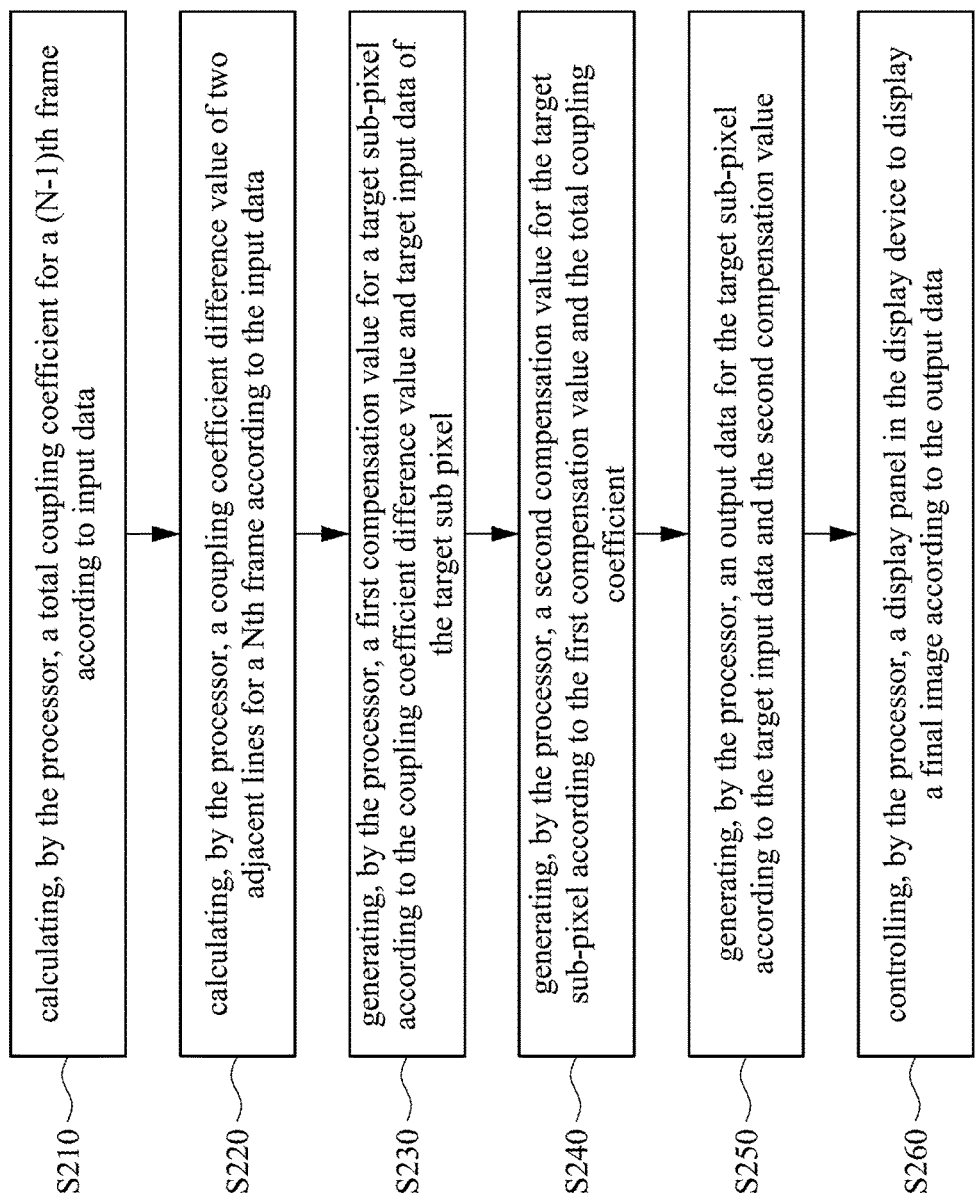
FIG. 2 is a flow diagram illustrating an operation method according to some embodiments of the present disclosure.

Reference is made to FIG. 2. FIG. 2 is a flow diagram illustrating an operation method 200 according to some embodiments of the present disclosure.

In some embodiments, as described above, the operation method 200 is performed by the circuits in the processor 110 in FIG. 1. In some other embodiments, the operation method 200 is performed by a processor. The processor can execute instructions in a program stored in a non-transitory computer readable storage medium (e.g., the memory 130) to realize functions of the circuits in the processor 110 in FIG. 1.

For better understanding, the operation method 200 is described below with reference to the processor 110 in FIG.

1, but the present disclosure is not limited thereto. As illustrated in FIG. 2, the operation method 200 includes operation S210, operation S220, operation S230, operation S240, operation S250, and operation S260.

At first, the processor 110 receives the input data IN of the image (e.g., the dynamic image). The input data IN includes a plurality of frames. For example, the input data IN at least include a (N−1)th frame and a Nth frame. Various frame numbers are within the contemplated scopes of the present disclosure.

Figure 7:
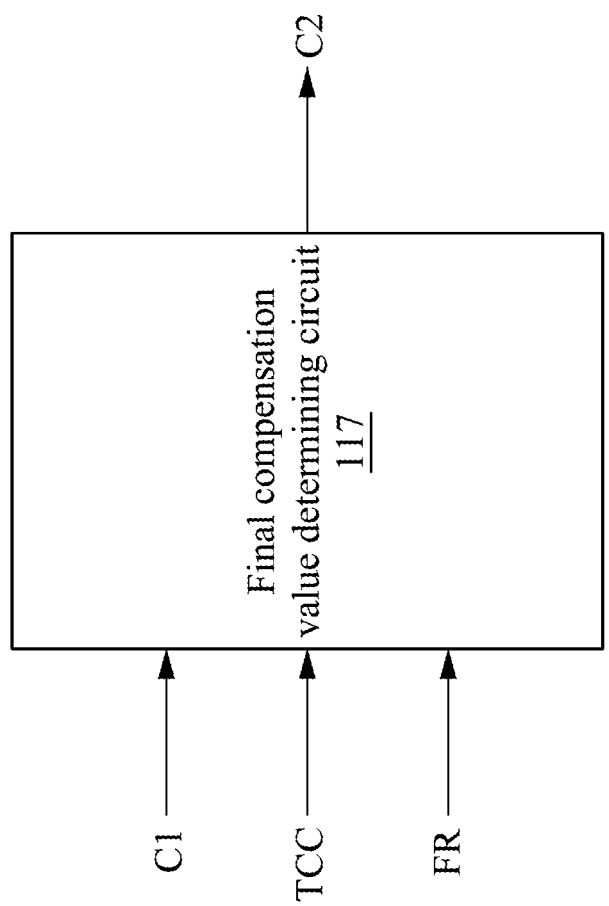
FIG. 7 is a schematic diagram illustrating operations of a final compensation value determining circuit according to some embodiments of the present disclosure.

In operation S210, the processor 110 calculates a total coupling coefficient TCC (as shown in FIG. 7) for the (N−1)th frame according to the input data IN. N can be a positive integer greater than 1.

Figure 3:
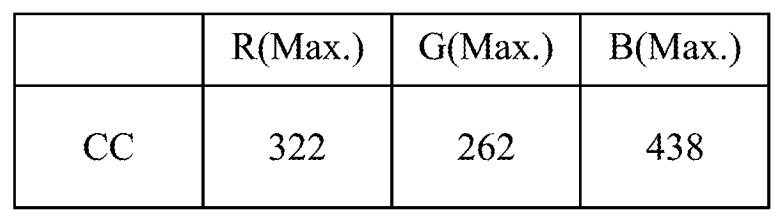
Figure 4:
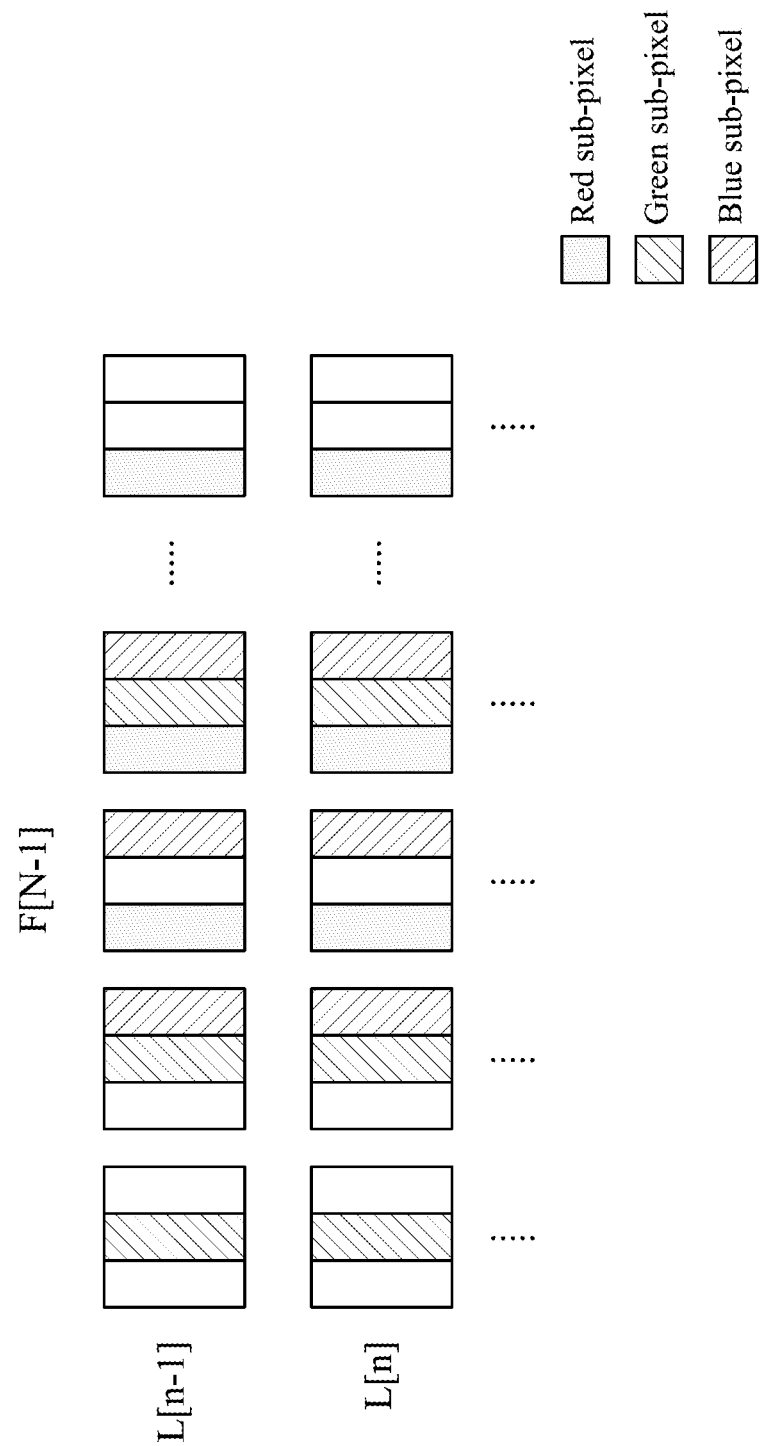
FIG. 4 is a schematic diagram illustrating a (N−1)th frame according to some embodiments of the present disclosure.
Figure 5:
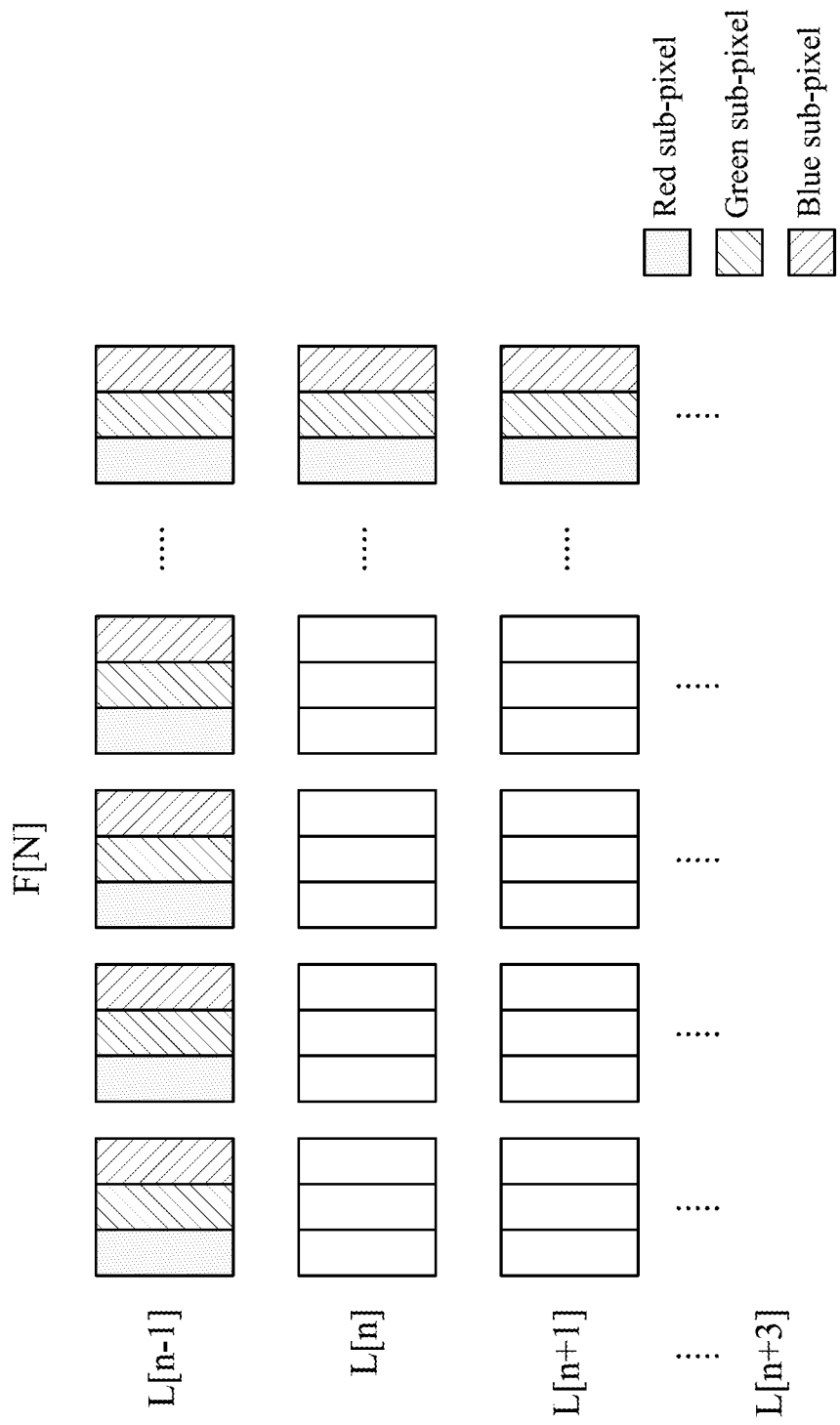
FIG. 5 is a schematic diagram illustrating a Nth frame according to some embodiments of the present disclosure.

References are made to FIG. 3 to FIG. 5. FIG. 3 is a schematic diagram illustrating coupling coefficients CC according to some embodiments of the present disclosure. FIG. 4 is a schematic diagram illustrating the (N−1)th frame F[N−1] (hereafter the frame F[N−1]) according to some embodiments of the present disclosure. FIG. 5 is a schematic diagram illustrating the Nth frame F[N] (hereafter the frame F[N]) according to some embodiments of the present disclosure.

The display panel 120 can include a plurality of pixels. Each of the pixels includes three sub-pixels. The three sub-pixels are a red sub-pixel, a green sub-pixel, and a blue sub-pixel. The image analyzing circuit 111 can convert gray levels of the frame F[N−1] of the red sub-pixels in the display panel 120, gray levels of the frame F[N−1] of the green sub-pixels in the display panel 120, and gray levels of the frame F[N−1] of the blue sub-pixels in the display panel 120 into a plurality of coupling coefficients CC respectively.

As illustrated in FIG. 3, different gray levels of the red sub-pixels are converted into different coupling coefficients CC respectively, in which a maximum gray level 255 of a red sub-pixel is converted into a coupling coefficient CC 322. Different gray levels of the green sub-pixels are converted into different coupling coefficients CC respectively, in which a maximum gray level 255 of a green sub-pixel is converted into a coupling coefficient CC 262. Different gray levels of the blue sub-pixels are converted into different coupling coefficients CC respectively, in which a maximum gray level of a blue sub-pixel is converted into a coupling coefficient CC 438. When a coupling coefficient CC of one sub-pixel is larger, the coupling effect (e.g., line crosstalk problem) caused from this sub-pixel is more serious. The conversion relationship between one gray level and one coupling coefficient can be a linear relationship, a quadratic relationship, a cubic relationship, or other suitable relationships. For simplicity, FIG. 3 merely illustrates the maximum gray levels of the sub-pixels with different colors, and other gray levels are omitted.

Then, the data accumulating circuit 112 can accumulate all coupling coefficients CC of the frame F[N−1] of all sub-pixels to generate the total coupling coefficient TCC (as shown in FIG. 7) for the frame F[N−1]. As illustrated in FIG. 4, the data accumulating circuit 112 can sum up the coupling coefficients CC of the frame F[N−1] of all sub-pixels in a line L[n−1], the coupling coefficients CC of the frame F[N−1] of all sub-pixels in a line L[n], and so on, to generate the total coupling coefficient TCC (as shown in FIG. 7) for the frame F[N−1]. When the total coupling coefficient TCC (as shown in FIG. 7) for the frame F[N−1] is larger, the coupling effect (e.g., line crosstalk problem) caused from the frame F[N−1] is more serious.

Figure 8:
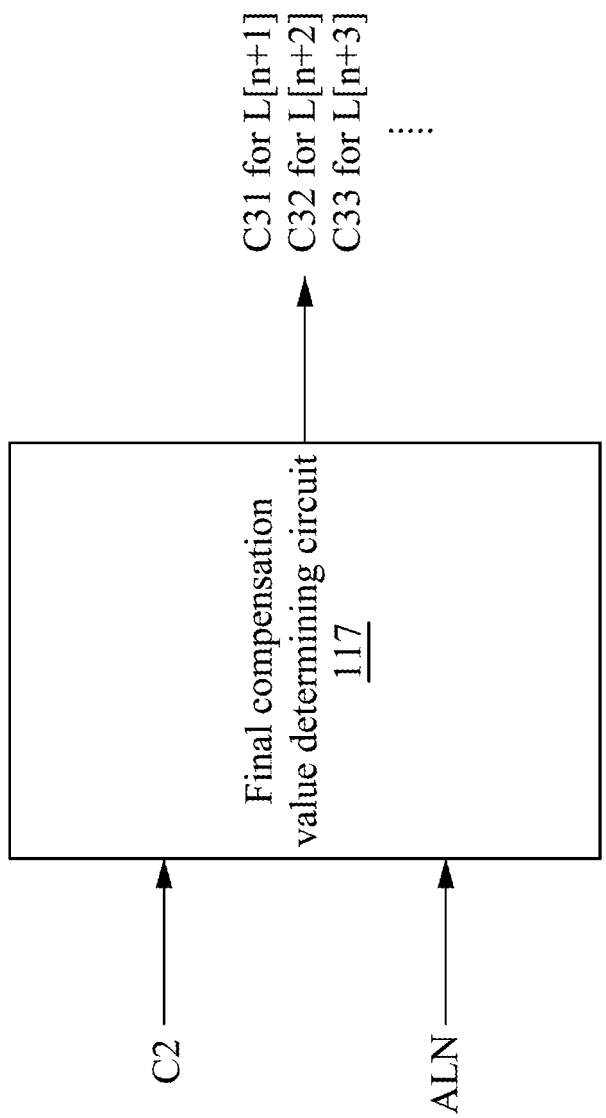
FIG. 8 is a schematic diagram illustrating more operations of the final compensation value determining circuit according to some embodiments of the present disclosure.

In operation S220, the processor 110 calculates a coupling coefficient difference value CCDV (as shown in FIG. 8) of two adjacent lines for the frame F[N] according to the input data IN.

Similarly, the image analyzing circuit 111 can convert gray levels of the frame F[N] of the red sub-pixels in the display panel 120, gray levels of the frame F[N] of the green sub-pixels in the display panel 120, and gray levels of the frame F[N] of the blue sub-pixels in the display panel 120 into coupling coefficients CC respectively.

As illustrated in FIG. 5, the data accumulating circuit 112 can accumulate all coupling coefficients CC of the frame F[N] of all sub-pixels in a line L[n−1] to generate a first line coupling coefficient for the frame F[N]. In addition, the data accumulating circuit 112 can accumulate all coupling coefficients CC of the frame F[N] of all sub-pixels in a line L[n] to generate a second line coupling coefficient for the frame F[N]. Then, the data accumulating circuit 112 can subtract the second line coupling coefficient from the first line coupling coefficient to generate a coupling coefficient difference value CCDV (as shown in FIG. 8) of the line L[n−1] and the line L[n]. When the coupling coefficient difference value CCDV (as shown in FIG. 8) is larger, the coupling effect (e.g., line crosstalk problem) caused from the line L[n−1] and the line L[n] of the frame F[N] is more serious. Other two adjacent lines have similar operations, so they are not described herein again.

Then, the initial position determining circuit 113 can determine an initial position affected by the coupling effect (e.g., line crosstalk problem) caused from the line L[n−1] and the line L[n] of the frame F[N]. In general, the initial position determining circuit 113 determines the initial position according to characteristic information of the display panel 120. For example, the initial position determining circuit 113 may determine that the initial position affected by the coupling effect (e.g., line crosstalk problem) is the line L[n−1], the line L[n], a line L[n+1], or other line.

In operation S230, the processor 110 generates a compensation value C1 for a target sub-pixel according to the coupling coefficient difference value CCDV (as shown in FIG. 8) and target input data of the target sub-pixel. For example, when the initial position determining circuit 113 determines that the initial position is the line L[n+1], the target sub-pixel can be disposed in the line L[n+1].

Figure 6:
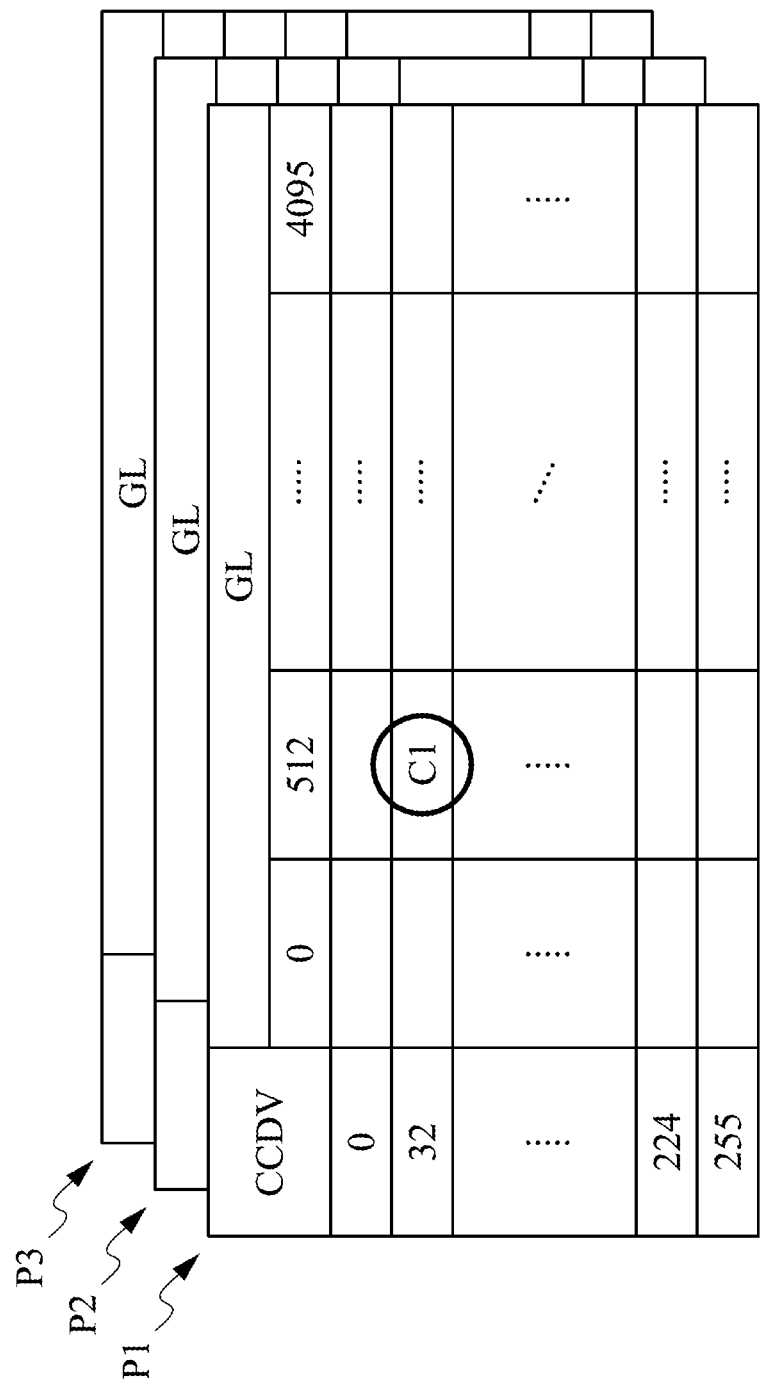
FIG. 6 is a schematic diagram illustrating a plurality of look-up tables according to some embodiments of the present disclosure.

Reference is made to FIG. 6. FIG. 6 is a schematic diagram illustrating the plurality of look-up tables LUT1 according to some embodiments of the present disclosure. As illustrated in FIG. 6, the memory 130 in FIG. 1 stores three look-up tables LUT1. The processor 110 generates a compensation value C1 based on the look-up tables LUT1.

The quantity of the look-up tables LUT1 is merely for illustration, and various suitable quantities are within the contemplated scopes of the present disclosure.

For example, the look-up tables LUT1 are for the red sub-pixels. The look-up tables LUT1 correspond to different OLED supply powers P1-P3 respectively. As illustrated in FIG. 6, one look-up table LUT1 is for the red sub-pixels and corresponds to the OLED supply power P1. Another look-up table LUT1 and corresponds to the OLED supply power P2. The other look-up table LUT1 is for the red sub-pixels and corresponds to the OLED supply power P3. The the horizontal axis of each look-up table LUT1 represents the coupling coefficient difference value CCDV calculated in operation S220, and the vertical axis of each look-up table LUT1 represents a gray level of one target sub-pixel.

It is assumed that current OLED supply power is P1, the coupling coefficient difference value CCDV (e.g., 8 bits) is 32, and the gray level GL (e.g., 12 bits) of the target red sub-pixel in the line L[n+1] (e.g., the initial position) is 512. The original compensation value determining circuit 114 can determine that the compensation value C1 in the look-up tables LUT1 to be an original compensation value of the target red sub-pixel in the line L[n+1].

In addition to the initial position determining circuit 113 determining that the initial position, the affected line number determining circuit 115 can determine how many lines are affected. In general, the affected line number determining circuit 115 determines how many lines are affected according to the input data IN. For example, when the initial position determining circuit 113 determines that the initial position is the line L[n+1] and the affected line number determining circuit 115 determines that three lines are affected, it represents that the line L[n+1] to a line [n+3] are affected by the coupling effect (e.g., line crosstalk problem).

In addition, the reverse determining circuit 116 can determine whether to perform a reverse compensation mechanism. The details about the determination of the reverse determining circuit 116 and the subsequent process based on the determination are described in later paragraphs.

Reference is made to FIG. 7. FIG. 7 is a schematic diagram illustrating operations of the final compensation value determining circuit 117 according to some embodiments of the present disclosure.

In operation S240, the processor 110 generates a compensation value C2 for the target sub-pixel according to the compensation value C1 and the total coupling coefficient TCC of the frame F[N−1]. In some embodiments, the final compensation value determining circuit 117 generates the compensation value C2 according to the total coupling coefficient TCC of the frame F[N−1] and a frame rate FR. For example, the total coupling coefficient TCC and the frame rate FR can correspond to a weighting value. The final compensation value determining circuit 117 generates the compensation value C2 according to a calculation result on the compensation value C1 and the weighting value. The calculation result can be a ratio calculation, an offset calculation, use of a look-up table, an addition calculation, a subtraction calculation, a multiplication calculation, a division calculation, a bit-shift calculation. Taking the multiplication calculation as an example, the final compensation value determining circuit 117 multiplies the compensation value C1 with the weighting value corresponding to the total coupling coefficient TCC and the frame rate FR to generate the compensation value C2. In some other embodiments, the total coupling coefficient TCC can correspond to a first weighting value and the frame rate FR can correspond to a second weighting value. The final compensation value determining circuit 117 multiplies the compensation value C1 with the first weighting value and the second weighting value to generate the compensation value C2. Taking the use of the look-up table as an example, the final compensation value determining circuit 117 can utilize the look-up table to determine the compensation value C2 according to the total coupling coefficient TCC and the frame rate FR.

In some other embodiments, the final compensation value determining circuit 117 can further consider a line compensation value, a reverse function, separate coefficients of different color sub-pixels, or display brightness values (DBV) coefficients to generate the compensation value C2.

Reference is made to FIG. 8. FIG. 8 is a schematic diagram illustrating more operations of the final compensation value determining circuit 117 according to some embodiments of the present disclosure.

For example, when the affected line number determining circuit 115 determines that an affected line number ALN is three and the affected lines L[n+1], L[n+2], and L[n+3] are affected by the coupling effect (e.g., line crosstalk problem), the final compensation value determining circuit 117 can perform a smoothing process to generate compensation values C31, C32, and C33 for the line L[n+1], the line L[n+2], and the line L[n+3] according to the compensation value C2, and the compensation values C31, C32, and C33 are for neighbor pixels in these affected lines L[n+1], L[n+2], and L[n+3] respectively. For example, the final compensation value determining circuit 117 multiplies the compensation value C2 with a ratio value 1 to generate the compensation value C31 for the neighbor pixel in the line L[n+1], and multiplies the compensation value C2 with a ratio value 0.8 to generate the compensation value C32 for the neighbor pixel in the line L[n+2], and multiplies the compensation value C2 with a ratio value 0.6 to generate the compensation value C33 for the neighbor pixel in the line L[n+3].

The ratio values above are merely for illustration, but the present disclosure is not limited thereto. Various suitable ratio values are within the contemplated scopes of the present disclosure.

In operation S250, the processor 110 generates the output data OUT for the target sub-pixel according to the target input data and the compensation value C2. For example, the outputting circuit 118 adds the target input data of the target sub-pixel and the compensation value C2 or subtracts the compensation value C2 from the target input data of the target sub-pixel to generate the output data OUT of the target sub-pixel.

Under a condition that the affected line number is more than one, the outputting circuit 118 can add the neighbor input data of a neighbor pixel in the affected lines L[n+1] (L[n+2], or L[n+3]) and the compensation value C31 (C32, or C33) or subtract the compensation value C31 (C32, or C33) from the neighbor input data of the neighbor pixel to generate the output data OUT of the neighbor pixel. To be more specific, the outputting circuit 118 can generate the output data OUT according to the determination of the reverse determining circuit 116. When the lines L[n+1], L[n+2], and L[n+3] are not getting darker and darker sequentially or are not getting brighter and brighter sequentially, the reverse determining circuit 116 determines that the reverse compensation mechanism needs to be performed. For example, when the line L[n+1] is a dark line, the line L[n+2] is a darker line, and the line L[n+3] is a bright line, the outputting circuit 118 can add the target input data of the target sub-pixel in the line L[n+3] and the compensation value C33 to generate the output data OUT of the target sub-pixel in the line L[n+3]. On the contrary, when the line L[n+1] is a bright line, the line L[n+2] is a brighter line, and the line L[n+3] is a dark line, the outputting circuit 118 can subtract the compensation value C33 from the target input data of the target sub-pixel in the line L[n+3] to generate the output data OUT of the target sub-pixel in the line L[n+3]. In some embodiments, the outputting circuit 118 also can perform the reverse compensation mechanism according to a reverse look-up table to determine the output data OUT of the target sub-pixel in the line L[n+3].

In operation S260, the processor 110 controls the display panel 120 to display a final image according to the output data OUT. For example, the outputting circuit 118 transmits the output data OUT to the display panel 120 and controls the display panel 120 to display the final image according to the output data OUT.

Based on the descriptions above, in the present disclosure, the coupling effect (e.g., line crosstalk problem) can be reduced due to the compensation operations since the coupling coefficient of the previous frame and the coupling coefficient difference value of two adjacent lines of the current frame are considered.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A processor in a display device, configured to perform following operations:
    calculating a total coupling coefficient for a (N−1)th frame according to input data, wherein N is a positive integer greater than 1;
    calculating a coupling coefficient difference value of two adjacent lines for a Nth frame according to the input data;
    generating a first compensation value for a target sub-pixel according to the coupling coefficient difference value and target input data of the target sub-pixel;
    generating a second compensation value for the target sub-pixel according to the first compensation value and the total coupling coefficient;
    generating an output data for the target sub-pixel according to the target input data and the second compensation value; and
    controlling a display panel in the display device to display a final image according to the output data.

2. The processor of claim 1, wherein calculating the total coupling coefficient comprises:
    converting a plurality of gray levels into a plurality of coupling coefficients respectively; and
    accumulating the plurality of coupling coefficients to generate the total coupling coefficient.

3. The processor of claim 1, wherein calculating the coupling coefficient difference value comprises:
    converting a plurality of gray levels into a plurality of coupling coefficients respectively;
    accumulating the plurality of coupling coefficients in a first line of the two adjacent lines to generate a first line coupling coefficient;
    accumulating the plurality of coupling coefficients in a second line of the two adjacent lines to generate a second line coupling coefficient; and
    subtracting the second line coupling coefficient from the first line coupling coefficient to generate the coupling coefficient difference value.

4. The processor of claim 1, wherein generating the first compensation value comprises:
    generating the first compensation value based on a look-up table.

5. The processor of claim 1, wherein generating the second compensation value comprises:
    generating the second compensation value according to the first compensation value, the total coupling coefficient, and a frame rate.

6. The processor of claim 5, wherein the total coupling coefficient and the frame rate correspond to a weighting value and generating the second compensation value comprises:
    generating the second compensation value according to the first compensation value and the weighting value.

7. The processor of claim 5, wherein generating the second compensation value comprises:
    performing a smoothing process to generate a third compensation value according to the second compensation value and an affected line number for a neighbor pixel in an affected line; and
    generating the output data for the neighbor pixel according to neighbor input data of the neighbor pixel and the third compensation value.

8. The processor of claim 7, wherein generating the output data comprises:
    adding the neighbor input data and the third compensation value to generate the output data or subtracting the third compensation value from the neighbor input data to generate the output data according to a determination of a reverse compensation mechanism.

9. The processor of claim 1, further comprising:
    determining a position of the target sub-pixel according to characteristic information of the display panel.

10. The processor of claim 1, wherein the display panel comprises an OLED display panel.

11. An operation method of a processor in a display device, wherein the operation method comprises following operations:
    calculating, by the processor, a total coupling coefficient for a (N−1)th frame according to input data, wherein N is a positive integer greater than 1;
    calculating, by the processor, a coupling coefficient difference value of two adjacent lines for a Nth frame according to the input data;
    generating, by the processor, a first compensation value for a target sub-pixel according to the coupling coefficient difference value and target input data of the target sub-pixel;
    generating, by the processor, a second compensation value for the target sub-pixel according to the first compensation value and the total coupling coefficient;
    generating, by the processor, an output data for the target sub-pixel according to the target input data and the second compensation value; and
    controlling, by the processor, a display panel in the display device to display a final image according to the output data.

12. The operation method of the processor in the display device of claim 11, wherein calculating the total coupling coefficient comprises:
    converting a plurality of gray levels into a plurality of coupling coefficients respectively; and
    accumulating the plurality of coupling coefficients to generate the total coupling coefficient.

13. The operation method of the processor in the display device of claim 11, wherein calculating the coupling coefficient difference value comprises:
    converting a plurality of gray levels into a plurality of coupling coefficients respectively;
    accumulating the plurality of coupling coefficients in a first line of the two adjacent lines to generate a first line coupling coefficient;
    accumulating the plurality of coupling coefficients in a second line of the two adjacent lines to generate a second line coupling coefficient; and subtracting the second line coupling coefficient from the first line coupling coefficient to generate the coupling coefficient difference value.

14. The operation method of the processor in the display device of claim 11, wherein generating the first compensation value comprises:

generating the first compensation value based on a lookup table.

15. The operation method of the processor in the display device of claim 11, wherein generating the second compensation value comprises:

generating the second compensation value according to the first compensation value, the total coupling coefficient, and a frame rate.

16. The operation method of the processor in the display device of claim 15, wherein the total coupling coefficient and the frame rate correspond to a weighting value and generating the second compensation value comprises:

generating the second compensation value according to the first compensation value and the weighting value.

17. The operation method of the processor in the display device of claim 15, wherein generating the second compensation value comprises:

performing a smoothing process to generate a third compensation value according to the second compensation value and an affected line number for a neighbor pixel in an affected line; and generating the output data for the neighbor pixel according to neighbor input data of the neighbor pixel and the third compensation value.

18. The operation method of the processor in the display device of claim 17, wherein generating the output data comprises:

adding the neighbor input data and the third compensation value to generate the output data or subtracting the third compensation value from the neighbor input data to generate the output data according to a determination of a reverse compensation mechanism.

19. The operation method of the processor in the display device of claim 11, further comprising:

determining a position of the target sub-pixel according to characteristic information of the display panel.

20. The operation method of the processor in the display device of claim 11, wherein the display panel comprises an OLED display panel.

* * * * *